(12) United States Patent
Yasukawa et al.

(10) Patent No.: US 11,130,862 B2
(45) Date of Patent: Sep. 28, 2021

(54) SILICONE RUBBER COMPOSITION, FIXING MEMBER, MANUFACTURING METHOD OF FIXING MEMBER, AND IMAGE FORMING APPARATUS INCLUDING FIXING MEMBER

(71) Applicant: Konica Minolta, Inc., Tokyo (JP)

(72) Inventors: Hiroyuki Yasukawa, Hachioji (JP); Hirofumi Koga, Hino (JP); Yoshiyasu Matsumoto, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 222 days.

(21) Appl. No.: 16/446,969

(22) Filed: Jun. 20, 2019

(65) Prior Publication Data
US 2020/0017684 A1    Jan. 16, 2020

(30) Foreign Application Priority Data

Jul. 13, 2018 (JP) .............................. JP2018-132840

(51) Int. Cl.
*C08L 83/04* (2006.01)
*G03G 15/20* (2006.01)

(52) U.S. Cl.
CPC ............ *C08L 83/04* (2013.01); *G03G 15/206* (2013.01)

(58) Field of Classification Search
CPC .............................. C08L 83/04; G03G 15/206
See application file for complete search history.

(56) References Cited

U.S. PATENT DOCUMENTS 5,455,313 A * 10/1995 Kurusu ................... C08L 83/04
428/35.8
2013/0178348 A1* 7/2013 Nakajima ............ G03G 15/206
492/56

FOREIGN PATENT DOCUMENTS

JP              2541436 B2    10/1996

* cited by examiner

*Primary Examiner* — Sandra Brase
(74) *Attorney, Agent, or Firm* — Lucas & Mercanti, LLP (57) ABSTRACT

A silicone rubber composition is a silicone rubber composition, in a fixing member having a rubber member on a surface, for forming the rubber member, and an integrated value of a high-molecular component from 32 minutes to 37 minutes of retention time in measurement of gas-chromatography mass spectrometry (GC/MS method) conducted under a predetermined condition is 3.0 or more.

8 Claims, 2 Drawing Sheets

SILICONE RUBBER COMPOSITION, FIXING MEMBER, MANUFACTURING METHOD OF FIXING MEMBER, AND IMAGE FORMING APPARATUS INCLUDING FIXING MEMBER

BACKGROUND

Technological Field

The present invention relates to a silicone rubber composition, a fixing member, a manufacturing method of a fixing member, and an image forming apparatus including the fixing member. In more detail, the present invention relates to, in the fixing member having a silicone rubber member used in the image forming apparatus, a silicone rubber composition for forming the rubber member excellent in durability.

Description of the Related Art

Conventionally, image forming apparatuses, such as a copying machine, a printer, and a facsimile machine, include the one including a heat-fixing device for applying heating processing to a recording material carrying an image by heat and a pressure. Examples of such heat-fixing devices include a fixing device for fixing or temporarily fixing an unfixed toner image on the recording material by heating processing. Moreover, a gloss increasing device which increases a gloss of an image by heating processing an image fixed on the recording material, a device for applying heating processing for drying the recording material on which an image is formed by inkjet and the like are included.

Many fixing members including silicone rubber are used in the heat-fixing device. Examples of the fixing members include a fixing roller, a fixing belt, and a pressurizing roller.

The fixing member in the heat-fixing device is heated to a high temperature. Thus, hardness of the silicone rubber is largely changed by cut-off of a crosslink portion in the silicone rubber, and durability of the fixing member has been a serious problem.

Moreover, volatilization of low-molecular compounds, such as low-molecular siloxane, from the silicone rubber provided in the fixing roller and discharge thereof from the image forming apparatus have been pointed out in recent years. Such problems have been reported that this low-molecular compound contaminates an environment in the image forming apparatus and adheres to an electronic component or the like and causes a contact fault. Moreover, such a problem has been reported that the volatilized low-molecular compounds become particles and become Ultrafine Particles (hereinafter, also referred to as UFP) and contaminate an inside of the image forming apparatus.

In order to reduce contamination in the apparatus, heating processing under a reduced pressure and washing treatment with various solvents are known (see Japanese Patent No. 2541436, for example). However, through the contamination in the apparatus is improved by them, it is known that deterioration of elasticity of the rubber or deterioration of durability are caused.

Therefore, a silicone rubber composition excellent in durability has been in demand. Moreover, a silicone rubber composition which is excellent in durability and can suppress contamination on peripheral members caused by volatilization of the low-molecular component in the silicone rubber has been also in demand.

The present invention has been made in view of the aforementioned problems/circumstances and has an object to provide a silicone rubber composition which is excellent in durability and can form a silicone rubber member. Moreover, the present invention has an object to provide a fixing member including a rubber member formed by the silicone rubber composition and a manufacturing method of the fixing member. Furthermore, the present invention has an object to provide an image forming apparatus including the fixing member.

SUMMARY

To achieve at least one of the aforementioned objects, a silicone rubber composition which reflects an aspect of the present invention is, in a fixing member having a rubber member on a surface used in an image forming apparatus, a silicone rubber composition for forming the rubber member, wherein in measurement using gas-chromatography mass spectrometry (GC/MS method) conducted under a predetermined condition, an integrated value of a high-molecular component from 32 minutes to 37 minutes of retention time is 3.0 or more.

BRIEF DESCRIPTION OF THE DRAWINGS

The objects, advantages and features provided by one or more embodiments of the invention will become more fully understood from the detailed description given hereinbelow and the appended drawings which are given by way of illustration only, and thus are not intended as a definition of the limits of the present invention, in which.

DETAILED DESCRIPTION OF EMBODIMENTS

Hereinafter, one or more embodiments of the present invention will be described with reference to the drawings. However, the scope of the invention is not limited to the disclosed embodiments.

A silicone rubber composition of the present invention is, in a fixing member having a rubber member on a surface used in an image forming apparatus, a silicone rubber composition for forming the rubber member and is characterized in that, in measurement using the gas-chromatography mass spectrometry (GC/MS method) conducted under a predetermined condition, an integrated value of a high-molecular component from 32 minutes to 37 minutes of retention time is 3.0 or more. This feature is a technical feature in common with or corresponding to the following embodiments.

By means of the present invention, a silicone rubber composition which can form a silicone rubber member excellent in durability can be provided. Moreover, a fixing member including the rubber member formed by the silicone rubber composition and a manufacturing method of the fixing member can be provided. Furthermore, an image forming apparatus including the fixing member can be provided.

An inducement mechanism or an action mechanism of an effect of the present invention is not made clear but can be assumed as follows.

A high-molecular component of the silicone rubber member used for the fixing member is considered to be a component which is hardly volatilized even in heating, a component not volatilized when the fixing device is used in a steady state, and a component remaining inside the silicone rubber for a long time. If such a component remains inside the rubber, it functions as a lubricant. This component is present between molecular chains inside the rubber and is considered to improve slipperiness of the molecular chains Since a certain amount or more of this component is present, it is assumed that slidability of the molecular chains is maintained, and durability of the rubber can be maintained.

As an embodiment of the present invention, it is preferable that in measurement using the gas-chromatography mass spectrometry (GC/MS method), an integrated value of a low-molecular component from 10 minutes to 32 minutes of retention time is 1.7 or less, and an integrated value of a high-molecular component from 32 minutes to 37 minutes of the retention time is within a range from 3.0 to 30, since becoming of the volatile component from the silicone rubber to particles and UFP can be kept minimum.

Moreover, it is preferable from a viewpoint of durability and reduction of UFP that, in measurement using the gas-chromatography mass spectrometry (GC/MS method), the integrated value of the low-molecular component from 10 minutes to 32 minutes of retention time is 1.3 or less, and an integrated value of a high-molecular component from 32 minutes to 37 minutes of the retention time is within a range from 5.0 to 30.

Moreover, it is preferable from the viewpoint of durability that 0.05 mass % or more of a high-molecular silicon compound having a weight-average molecular weight within a range from 900 to 1700 is contained.

Furthermore, it is preferably a fixing member molded by using the silicone rubber composition of the present invention.

As a manufacturing method of the fixing member for manufacturing the fixing member of the present invention, it is preferably a manufacturing method in an aspect including preparing a silicone mixture by adding a high-molecular silicon compound having a weight-average molecular weight within a range from 900 to 1700 to a silicone rubber raw-material, and heating a precursor of a silicone rubber made of the silicone mixture.

A temperature in the heating process is preferably within a range from 160 to 280° C.

An image forming apparatus including the fixing member of the present invention is preferable.

Hereinbelow, detailed description will be made on the present invention and constituent elements thereof and forms/aspects for implementing the present invention. In this application, the term "to" is used with a meaning including numeral values described before and after that as a lower limit value and an upper limit value.

[Silicone Rubber Composition]

A silicone rubber composition of the present invention is, in a fixing member having a rubber member on a surface used in an image forming apparatus, a silicone rubber composition for forming the rubber member and is characterized in that, in measurement using the gas-chromatography mass spectrometry (GC/MS method) conducted under a predetermined condition, an integrated value of a high-molecular component from 32 minutes to 37 minutes of retention time is 3.0 or more. By means of such configuration, durability of the fixing member having the silicone rubber composition of the present invention can be improved.

Moreover, as a preferable aspect, in the measurement by the GC/MS method, when the integrated value of a low-molecular component from 10 minutes to 32 minutes of retention time is 1.7 or less, a fixing member which can suppress contamination on a peripheral member caused by volatilization of the low-molecular component in the fixing member can be formed.

The inventors paid attention to the molecular weight in examination of the silicone rubber composition forming the rubber member excellent in durability and carried out a keen research.

The high-molecular component is a component which is hardly volatilized even in heating, is a component not volatilized when the fixing device is used in a steady state and is a component remaining in the silicone rubber for a long time. If such a component remains inside the rubber, it functions as a lubricant. This component is considered to be present between molecular chains inside the rubber and improves slipperiness of the molecular chains Since a certain amount or more of this component is present, slidability of the molecular chains is maintained, and durability of the rubber can be maintained. This component is present in a grease state or a viscous liquid state in a region from a normal temperature to approximately 200° C. and is a component which can be present between the molecular chains, and can maintain slidability of the molecular chains, and as a result, cut-off of the molecular chains in continuous use can be suppressed and is presumed to improve durability.

As the result of examination, it was found that, in order for the silicone rubber composition to obtain sufficient durability, the integrated value of the high-molecular component in the measurement of the GC/MS method needs to be 3.0 or more. As a result, durability in use of approximately at 200° C. and for 1000 hr can be maintained More preferably, with the integrated value of the high-molecular component at 5.0 or more, durability in use of approximately at 200° C. and for 2000 hr can be maintained. It is preferable that the integrated value of the high-molecular component does not exceed 30 since if the integrated value of the high-molecular component is within 30, such a situation that the silicone rubber component bleeds out to the surface and contaminates a fixed image during printing does not occur.

Correlation between the durability of the fixing member using the silicone rubber composition and this high-molecular component is a point newly found this time, and it is necessary to hold a larger amount of the high-molecular component inside at an initial stage in expectation of a reduction of the high-molecular component in printing. In the present invention, the fixing member is preferably manufactured by the manufacturing method having a process of preparing a silicone mixture by adding a high-molecular silicone compound with a weight-average molecular weight within a range from 900 to 1700 to a silicone rubber raw-material and a process of heating a precursor of the silicone rubber made of the silicone mixture.

Moreover, the inventors paid attention to a state of a rubber component in which a fixing roller does not have to be covered with a resin film and a volatile component is not volatilized to an outside and paid attention not only to an amount of the volatile component but also to a molecular weight of the contained volatile component and a component which is not volatilized at a low temperature but is likely to be volatilized at a high temperature, and they conducted a keen research.

Nonconformities that low-molecular siloxane volatilized from silicone rubber used in a fixing roller or a fixing belt in the fixing member contaminates ambient environments, adheres to a contact and causes an insulating fault and a contact fault or the like, and the volatilized components become particles and contaminate the inside of the apparatus have been reported. The low-molecular component can be detected before 32 minutes of the retention time, but this component is a component volatilized in use (approximately at 200° C.) as the fixing device and is a component which is highly likely to be diffused into the atmosphere.

In the present invention, it was found that low-molecular siloxane volatilized from the silicone rubber can be reduced if the integrated value of the low-molecular component is 1.7 or less in the measurement of GC-MS in the silicone rubber. It has an effect particularly for a member applied to a device used in an electrophotography. Among them, the effect can be exerted more markedly when it is applied to a member used in the fixing device and its periphery.

In fixation, a process of fixing a toner on paper is provided, and the toner needs to be fixed to the paper by heating and pressing processing, but the fixing device is also heated, and a use situation at a high temperature needs to be assumed. That is, it is important to include a process of promoting volatilization of the low-molecular component by heating or the like also in actual use of the member, and since there is possibility that the low-molecular component is volatilized and contaminates the inside of the device as described above, the effect of the present invention can be exerted more easily by application to such products.

If the low-molecular component in the measurement by the GC-MS method is 1.7 or less, becoming of the volatilized component from the silicone rubber to particles and UFP can be minimized. That is considered to be because, if the component weight is not larger than that, the volatile component from the silicone rubber grows to particles which can be detected even when the volatile component is cooled. If the low-molecular component weight is larger than 1.7, the volatile component becomes particles, and particle growth occurs, which incurs emergence of a phenomenon that they can be detected as particles observable by an observing device, which is not preferable. More preferably, the low-molecular component is 1.3 or less, and in this case, the component is substantially volatilized, and few cooled particles are detected, and a state where at least particle generation is not carried out can be created, and there is even a possibility that a volatilization amount can be made substantially zero.

As described above, in the present invention, by regulating the inside of the rubber by the high-molecular component that can be detected by the measurement of GC-MS, the nonconformity related to durability is solved and by regulating the low-molecular component by a preferred embodiment, means for reducing the low-molecular siloxane contained in the fixing member so as to reduce UFP can be provided.

The "measurement by the gas-chromatography (GC/MS method) conducted under a predetermined condition" in the present invention refers to the GC/MS measurement conducted for a soluble component solvent-extracted from the silicone rubber composition by the following observing device, a column condition and a temperature-rise condition:

<Solvent Extraction Method>

A sample of a size of approximately 1 cm width×12 cm×1 cm is cut out (if there are a rubber layer and a sponge layer, both are cut out altogether) and cut into a cuboid shape having a side of approximately 5 mm. It is immersed in 50 mL of chloroform and agitated at a normal temperature for 2 hours and then, left for 24 hours. After it is filtered by using a membrane filter having a hole diameter of 1 micron, it is dried at a normal temperature so as to obtain a dried and hardened article. The obtained dried and hardened article is dissolved into hexane so as to have a 10 mL solution.

<GC/MS Measuring Method>

(GC Condition)

Time when the sample was injected is set to 0 minutes of the retention time and is held at 40° C. for 5 minutes and then, the temperature is raised to 140° C. at a rate of 5° C./min. The temperature is raised from 140 to 290° C. at a rate of 20° C./min. As a column, DB-XLB 30 m (by Agilent Technologies, Inc.) is applied. Detection peak values are integrated so as to have an observation value.

The other conditions are as follows:

Injection port temperature: 250° C.

Carrier gas: Helium

Carrier gas flowrate: 1 mL/minute (Ms Condition)

Mass analyzer temperature: interface: 320° C., ion source: 250° C.

Detector voltage: 1000 V

The integrated value in the present invention refers to a percentage to a total area of all the peaks of the integrated values of the observation values (peak areas) during predetermined retention time (from 32 minutes to 37 minutes) in the measurement of the GC/MS method conducted under the aforementioned predetermined condition.

Moreover, the low-molecular component in the present invention refers to a component observed during a period from 10 minutes to 32 minutes of the retention time in the measurement of the GC/MS method conducted under the aforementioned predetermined condition. In polydimethylsiloxane, those having a molecular weight within a range from 200 to 900 are low-molecular silicon compounds.

Moreover, the high-molecular component in the present invention refers to a component observed during a period from 32 minutes to 37 minutes of the retention time in the GC/MS method conducted under the aforementioned predetermined condition. In polydimethylsiloxane, those having a weight-average molecular weight within a range from 900 to 1700 are high-molecular silicon compounds.

Moreover, since there is a correlation between the integrated value of the component observed from 32 minutes to 37 minutes of the retention time and a content of the high-molecular component, the content of the high-molecular component in the silicone rubber component can be calculated. If the integrated value of the high-molecular component from 32 minutes to 37 minutes of the retention time is within the range from 5.0 to 30, it was confirmed in polydimethylsiloxane that the silicone rubber composition contained 0.05 mass % or more of high-molecular silicon compound. The content of 0.05 mass % or more of the high-molecular silicon compound in the present invention is a value obtained by converting the high-molecular silicon compound to polydimethylsiloxane.

In the present invention, the high-molecular silicon compound with the weight-average molecular weight within the range from 900 to 1700 is mixed with a silicone rubber raw-material, and the contents of the aforementioned low-molecular component and the high-molecular component can be adjusted by heating the silicone rubber precursor at a predetermined temperature for a predetermined time. A highest value of the heating temperature at this heating is preferably within a range from 160 to 280° C. Moreover, the heating time is preferably within a range from 30 to 300 minutes or more preferably within a range from 35 to 60 minutes.

As described above, by adding the high-molecular silicon compound to the silicone rubber raw-material, the silicone rubber composition having a large quantity of the high-molecular component remained and excellent durability can be obtained and moreover, by executing heating processing with this as the precursor of the silicone rubber within the aforementioned temperature range, the silicone rubber composition having excellent durability and a small quantity of the low-molecular component can be obtained.

As the silicone rubber raw-material, well-known various organosiloxanes which are raw materials of addition-type silicone rubber can be used. Examples of organosiloxane include 1,3,5,7-tetravinyl-1,3,5,7-tetramethylcyclotetrasiloxane.

Moreover, well-known additives can be added.

In this Description, the "precursor of silicone rubber" refers to a state before the silicone rubber raw-material molded by a low-molecular monomer or the like is hardened with regard to the silicone rubber for forming the rubber member of the fixing member of the present invention.

[Fixing Member]

The fixing member of the present invention is used in an electrophotographic image forming apparatus, for example, and has a rubber member on the surface. Moreover, the rubber member is molded by using the silicone rubber composition of the present invention. The fixing member is a fixing roller or a fixing belt, for example.

[Fixing Roller]

Figure 1:
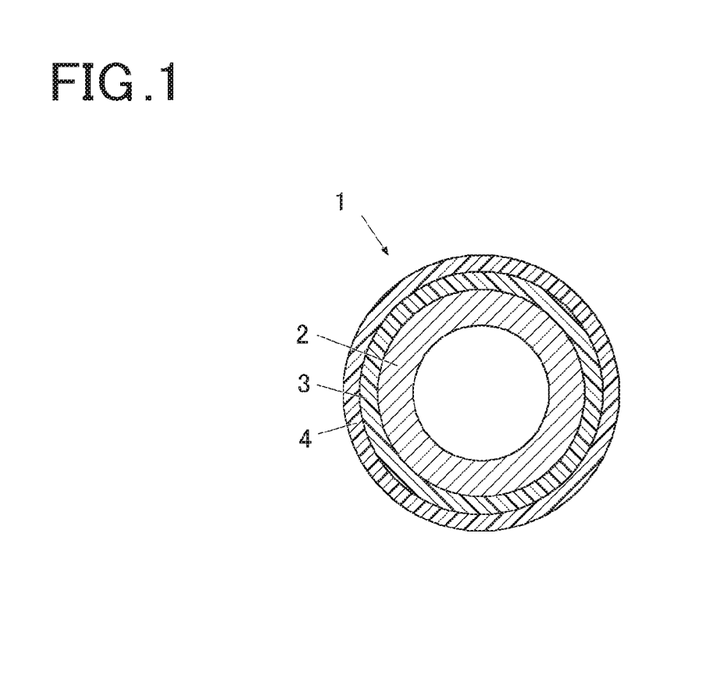
FIG. 1 is a sectional view illustrating an outline configuration of an example of a fixing roller.

The fixing roller is preferably a rubber roller for fixing a toner on the sheet in the electrophotographic image forming apparatus and is constituted by covering the rubber member molded by using the silicone rubber composition of the present invention on an outer layer of a core material. Examples of the fixing roller of the present invention include a cylindrical roller having the silicone rubber (hereinafter, referred to simply as a rubber member in some cases) on the surface layer as illustrated in FIG. 1, for example.

The fixing roller 1 may have a three-layered structure of a core metal 2, a solid rubber layer 3 provided so as to cover an outer peripheral surface of the core metal 2, and a sponge rubber layer 4 provided so as to cover the outer peripheral surface of the solid rubber layer 3 but that is not limiting. Here, the solid rubber layer 3 and the sponge rubber layer 4 are preferably constituted by the silicone rubber, respectively.

In the fixing roller, the core metal 2 is preferably constituted by a metal material, such as aluminum, iron, and stainless steel.

A thickness of the core metal 2 is approximately 0.1 to 1.5 mm but by considering weight reduction and warm-up time, it is more preferably approximately 0.1 to 5 mm. A diameter of the core metal 2 is preferably approximately 10 to 50 mm.

The silicone rubber preferably has heat resistance against the aforementioned fixing temperature and elasticity in order to ensure a dimension (a length of a nip portion) of a region where the sheet is pressure-fit.

The solid rubber layer 3 is a solid-state hard layer. A thickness of the solid rubber layer 3 is preferably within a range from 5 to 10 mm and more preferably within a range from 7 to 8 mm.

On the other hand, the sponge rubber layer 4 is a sponge-like soft layer containing a large number of micro balloons. A thickness of the sponge rubber layer 4 is preferably within a range from 5 to 100 μm or more preferably within a range from 80 to 90 μm.

[Fixing Device]

Figure 2:
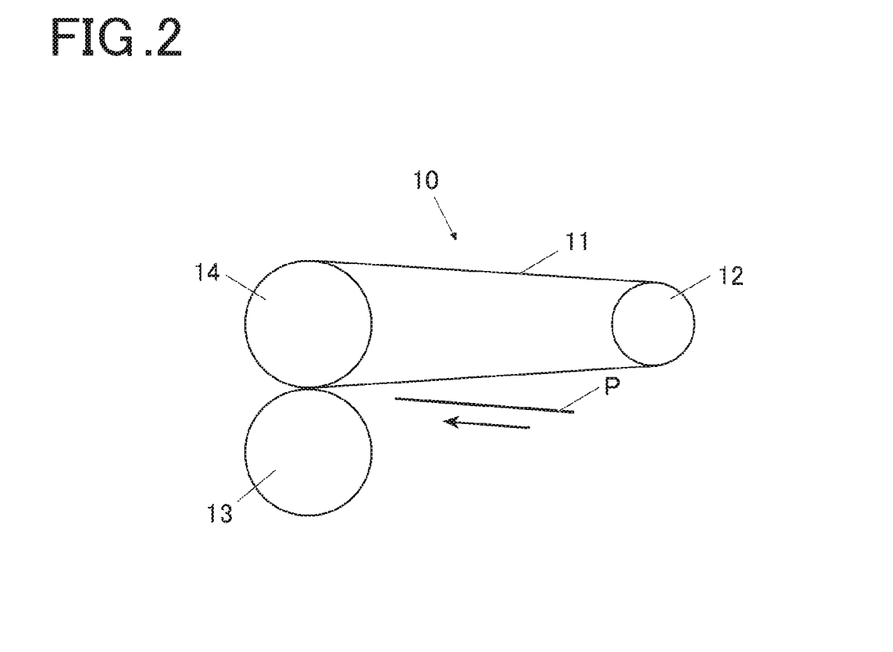
FIG. 2 is a schematic view illustrating an example of a fixing device.

The fixing roller is used in the fixing device. FIG. 2 is a schematic view illustrating an example of the fixing device. For example, the fixing device may be a two-shaft belt type fixing device as illustrated in FIG. 2 or may be a one-shaft belt type illustrated in a heating roller 132 or a pressurizing roller 131 in FIG. 3 which will be described later.

In the two-shaft belt type fixing device illustrated in FIG. 2, in the fixing device 10, a heating roller 12 and a first pressurizing roller 13 as well as a second pressurizing roller 14 press-fit by the first pressurizing roller 13 each having a rotation shaft in a direction perpendicular to a sheet surface are disposed, and a transfer material P is conveyed between them. The heating roller 12 is hollow at least partially, and a heat source (not shown), such as a heater, is disposed in the hollow part. The fixing belt 11 is heated by heat generation inside this.

[Manufacturing Method of Fixing Member]

The manufacturing method of a fixing member of the present invention is characterized by having a process of preparing a silicone mixture by adding a high-molecular silicon compound having a weight-average molecular weight within a range from 900 to 1700 to the silicone rubber raw-material and a process of heating the precursor of the silicone rubber made of the silicone mixture. As described above, by means of the process of preparing the silicone mixture by adding the high-molecular silicon compound to the silicone rubber raw-material, a silicone rubber composition containing a large quantity of the high-molecular component and having excellent durability can be obtained, and by means of the process of heating the precursor of the silicone rubber made of the silicone mixture, the silicone rubber composition having excellent durability and a small quantity of the low-molecular component can be obtained.

(Process of Preparing Silicone Mixture)

The process of preparing the silicone mixture is a process of preparing a silicone mixture by adding the high-molecular silicon compound having the weight-average molecular weight within a range from 900 to 1700 to the silicone rubber raw-material. Hereinbelow, a specific example of a process before the process of heating in the present invention, that is, until a method of forming the precursor of the silicone rubber which is a rubber member of the fixing member will be described with regard to the fixing roller illustrated in FIG. 1 which is an example of the fixing member.

First, the high-molecular silicon compound having the weight-average molecular weight within a range from 900 to 1700 and a hardening agent (CAT-1602 by Shin-Etsu Chemical Co., Ltd., for example) are added to the silicone rubber raw-material molded by a monomer with a low molecular weight or the like and sufficiently mixed by a stirring machine so as to obtain the silicone mixture. Thermally expandable microcapsules or other additives may be added as necessary. For example, the thermally expandable microcapsules having been expanded (Expancel 461 which is a micro balloon by Akzo Nobel N.V., for example) is added to this silicone mixture and mixed in the stirring machine so that the silicone mixture containing the thermally expandable microcapsules can be obtained.

For example, a core metal made of aluminum and a paper tube thicker than the core metal and covering the core metal so that the core metal comes to the center, the silicone mixture not containing the thermally expandable microcapsules is injected between the paper tube and the core metal and heated, and hardening is completed and then, the paper tube is removed so as to from the solid rubber layer.

After that, the silicone mixture containing the thermally expandable microcapsules is applied on this solid rubber layer so as to have the precursor of the silicone rubber.

Subsequently, the precursor of this silicone rubber can be made into silicone rubber constituting the rubber member of the fixing member via the process of heating according to the present invention.

The method of forming the precursor of the silicone rubber is not limited to the above but the silicone mixture containing the rubber raw material may be applied directly on the core metal so as to have the precursor of the silicone rubber, for example.

(High-Molecular Silicon Compound Having Weight-Average Molecular Weight within a Range from 900 to 1700)

By causing the high-molecular silicon compound having weight-average molecular weight within a range from 900 to 1700 to be contained in the silicone rubber composition, durability can be increased. With regard to an added amount, an amount with which the integrated value of the high-molecular component from 32 minutes to 37 minutes of the retention time in the measurement of the aforementioned gas-chromatography mass spectrometry (GC/MS method) becomes 3.0 or more is preferably added. More preferably, the amount with which the integrated value of the high-molecular component becomes within a range from 3.0 to 30 is added. Further preferably, the amount with which the integrated value of the high-molecular component becomes within a range from 5.0 to 30 is added.

A method of adding is not particularly limited. It is preferable that stirring is sufficient to obtain a uniform mixture. Moreover, the high-molecular silicon compound having the weight-average molecular weight within a range from 900 to 1700 can be used particularly without limitation, but use of the one in which a pressure of silicone oil is reduced and the low-molecular component is removed is preferable since contamination on the peripheral member caused by volatilization of the low-molecular component in the silicone rubber can be suppressed when the integrated value of the low-molecular component from 10 minutes to 32 minutes of the retention time is made 1.7 or less and is used for the fixing member. For the silicone oil, those sold in the market can be used. For example, KF-96-30CS, KF-96-500CS and the like by Shin-Etsu Chemical Co., Ltd. can be used.

As a condition of pressure reduction, it can be performed within a range of $1\times10^{-2}$ to $1\times10^{-3}$ kPa for approximately 30 to 60 minutes. For example, processing can be executed at $1.33\times10^{-2}$ kPa for 60 minutes.

The measurement of the weight-average molecular weight of the high-molecular silicon compound can be made by using gel permeation chromatography (GPC). An example of the measurement condition is as follows, but this is not limiting, and equivalent measurement methods can be also used.

Solvent: methylene chloride
Column: Shodex K806, K805, K803G (three units by Showa Denko K.K. are connected to use)
Column temperature: 25° C.
Sample concentration: 0.1 mass %
Detector: RI Model 504 (by GL Science Inc.)
Pump: L6000 (by Hitachi, Ltd.)
Flowrate: 1.0 ml/min
Calibration curve: Standard polystyrene STK standard polystyrene (by Tosoh Corporation) a calibration curve by 13 samples with Mw=1000000 to 500 is used. The 13 samples are used substantially at an equal interval.

[Process of Heating Precursor]

The process of heating the precursor is a process of heating the silicone precursor made of the silicone mixture described above. The heating may be performed at heating when the rubber member constituting the fixing member is shaped or vulcanized or a process of separately heating after shaping or vulcanization may be provided and the heating may be performed at the heating. The temperature in the heating process is preferably within a range from 160 to 280° C. Moreover, the heating time is preferably within a range from 30 to 300 minutes and more preferably within a range from 35 to 60 minutes. As described above, by adding the high-molecular silicon compound to the silicone rubber raw-material, the silicone rubber composition having a large quantity of the high-molecular component and excellent durability can be obtained, and moreover, by applying heating processing within the aforementioned temperature range with this as the precursor of the silicone rubber, the fixing member having excellent durability and a small amount of low-molecular component can be obtained.

The method of heating is not particularly limited, and well-known methods can be applied. In general, the precursor of the silicone rubber stored inside a chamber is heated by heating the chamber from an outside. The heating method may be either of a batch type and a continuous type. In the case of the batch type, for example, it may be such a method that the precursor of the silicone rubber is laid in the chamber and heated for a predetermined time and then, removed. In the case of the continuous type, it may be such a method that, by using a cylindrical heating chamber, heating is performed for a predetermined time while the precursor of the silicone rubber is moved inside the heating chamber.

[Image Forming Apparatus]

An example of a schematic constitution of a color-tandem type image forming apparatus 100 including the fixing member of the present invention will be described by using FIG. 3. This image forming apparatus is a complex machine including functions of a scanning machine, a copying machine, and a printer and the one called MFP (Multi Function Peripheral or Multi Function Printer).

Figure 3:
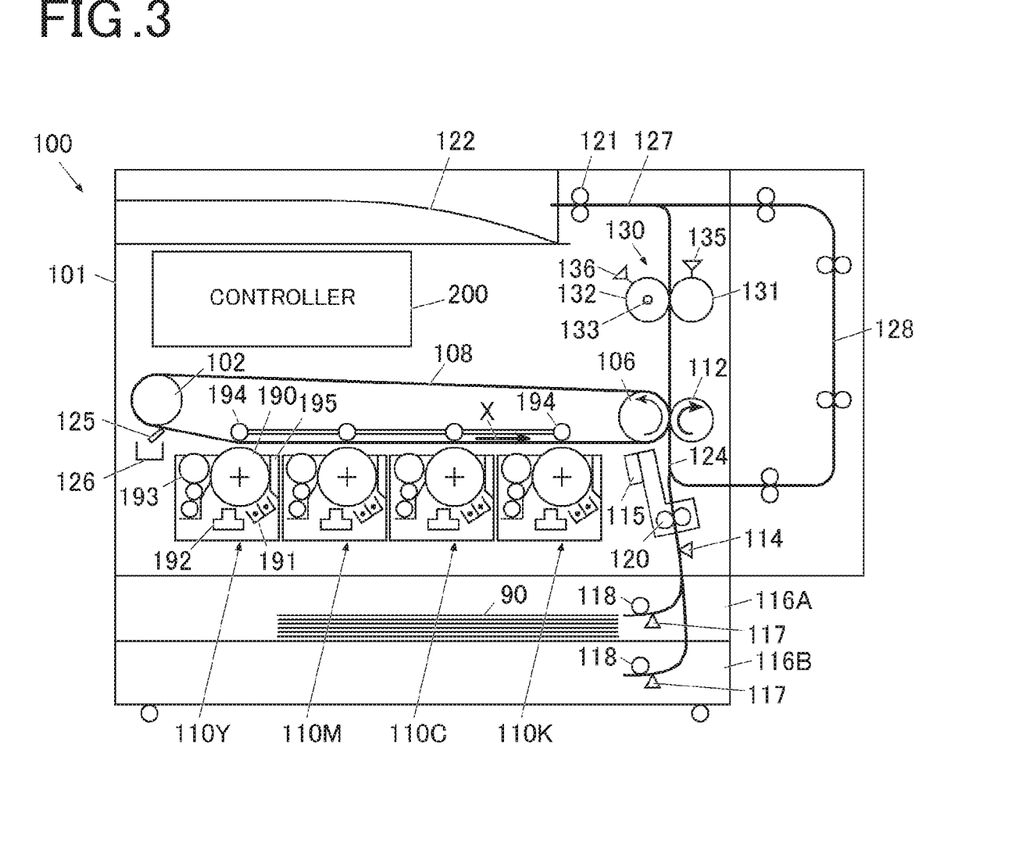
FIG. 3 is a schematic view illustrating an outline configuration of an electrophotographic image forming apparatus.

As illustrated in FIG. 3, the image forming apparatus 100 includes an annular intermediate transfer belt 108 wound around two rollers 102 and 106 substantially at a center in a body casing 101 and moving in a circumferential direction.

One roller 102 of the two rollers 102 and 106 is disposed on the left side in the figure, while the other roller 106 is disposed on the right side in the figure. The intermediate transfer belt 108 is supported by these rollers 102 and 106 and rotated/driven in an arrow X direction.

Below the intermediate transfer belt 108, image forming units 110Y, 110M, 110C, and 110K corresponding to color toners of yellow (Y), magenta (M), cyan (C), and black (K), respectively, are aligned and disposed in order from the left side in the figure.

The image forming units 110Y, 110M, 110C, and 110K are constituted similarly to one another except a difference in toner colors handled by them.

For example, the yellow image forming unit 110Y is constituted by integrating a photosensitive drum 190, a charging device 191, an exposure device 192, a developing device 193 performing development by using the toner, and a cleaner device 195.

A primary transfer roller 194 is provided at a position faced with the photosensitive drum 190 with the intermediate transfer belt 108 between them.

In image forming, first, a surface of the photosensitive drum 190 is uniformly charged by the charging device 191 and then, the surface of the photosensitive drum 190 is exposed by the exposure device 192, and a latent image is formed thereon. Subsequently, the latent image on the surface of the photosensitive drum 190 is developed by the developing device 193 and becomes a toner image. This toner image is transferred to the intermediate transfer belt 108 by voltage application between the photosensitive drum 190 and the primary transfer roller 194. The transferring residual toner on the surface of the photosensitive drum 190 is cleaned by the cleaner device 195.

With movement of the intermediate transfer belt 108 in the arrow X direction, toner images in four colors are overlapped and formed as output images on the intermediate transfer belt 108 by each of the image forming units 110Y, 110M, 110C, and 110K.

On the left side of the 108, a cleaning device 125 for removing the residual toner from the surface of the intermediate transfer belt 108 and a toner recovery box 126 for recovering the toner removed by the cleaning device 125 are provided.

On the right side of the intermediate transfer belt 108, a secondary transfer roller 112 is provided with a conveyance path 124 for sheets between them. A conveyance roller 120 is provided at a position corresponding to an upstream side of the secondary transfer roller 112 in the conveyance path 124. An optical concentration sensor 115 for detecting a toner pattern on the intermediate transfer belt 108 is provided.

On an upper right part in the body casing 101, a fixing device 130 for fixing the toner on the sheet is provided.

The fixing device 130 includes a pair of fixing rollers of the present invention extending perpendicularly to the sheet surface in FIG. 3. One of the fixing rollers is the heating roller 132 and the other is the pressurizing roller 131.

The heating roller 132 is heated by a heater 133 to a predetermined target temperature (a fixing temperature within a range from 180 to 200° C., for example). The pressurizing roller 131 is biased toward the heating roller 132 by a spring, not shown. As a result, the pressurizing roller 131 and the heating roller 132 form a nip portion for fixation.

When a sheet 90 on which the toner image is transferred passes through this nip portion, the toner image is fixed on the sheet 90. The temperatures of the pressurizing roller 131 and the heating roller 132 are detected by temperature sensors 135 and 136, respectively.

On a lower part of the body casing 101, paper-feed cassettes 116A and 116B for accommodating the sheets 90 are provided in two stages. In FIG. 3, a state where the sheet 90 is accommodated only in the paper-feed cassette 116A is illustrated.

In each of the paper-feed cassettes 116A and 116B, a paper-feed roller 118 for feeding out the sheet and a paper-feed sensor 117 for detecting the fed-out sheet are provided.

In the body casing 101, a controller 200 including a CPU (central processing unit) which controls an operation of the entire image forming apparatus is provided.

In image forming, the sheet 90 is fed from the paper-feed cassette 116A to the conveyance path 124 one by one by the paper-feed roller 118 under control of the controller 200. The sheet 90 fed out to the conveyance path 124 is fed into a toner transfer position between the intermediate transfer belt 108 and the secondary transfer roller 112 by the conveyance roller 120 at timing taken by a resist sensor 114.

On the other hand, toner images in four colors are overlapped and formed on the intermediate transfer belt 108 by each of the image forming units 110Y, 110M, 110C, and 110K, and the toner images in four colors on the intermediate transfer belt 108 are transferred to the sheet 90 fed into a toner transfer position by the secondary transfer roller 112.

The sheet 90 on which the toner images have been transferred is conveyed through the nip portion made by the pressurizing roller 131 and the heating roller 132 of the fixing device 130 and heated and pressurized. As a result, the toner images are fixed on the sheet 90.

Lastly, the sheet 90 on which the toner images are fixed is discharged to a paper discharge tray portion 122 provided on an upper surface of the body casing 101 through a paper discharge path 127 by a paper discharge roller 121.

In the image forming apparatus 100, a switchback conveyance path 128 for feeding the sheet 90 again to the toner transfer position in the case of double-sided printing is provided.

As described above, the pressurizing roller 131 constitutes one of the fixing rollers and a roller made of silicone rubber is used here.

Embodiments to which the present invention can be applied are not limited to the aforementioned embodiment but can be changed as appropriate within a range not departing from the gist of the present invention.

Moreover, in the aforementioned embodiment, the case of the fixing roller as the fixing member is described as an example, but the fixing belt can be also manufactured and used similarly. Moreover, the fixing belt in the Description is a fixing belt formed by silicone rubber used when the toner is to be fixed on the sheet in the electrophotographic image forming apparatus. More specifically, it refers to the well-known fixing belts used in the fixing device as described in Japanese Patent Laid-Open No. 2017-194550, Japanese Patent Laid-Open No. 2017-173445, Japanese Patent Laid-Open No. 2017-97187 and the like.

EXAMPLE

Hereinbelow, the present invention will be described more specifically by citing examples, but the present invention is not limited to them. In the examples, indication of a "part" or '%' is used, but it expresses a "mass part" or "mass %" unless otherwise indicated.

<Preparation of High-Molecular Silicon Compounds K1 and K2>

The silicone oil; KF-96-30CS was subjected to reduced-pressure distillation for 60 minutes under a condition of 250° C. and $1.33 \times 10^{-2}$ kPa and from which the low-molecular component was evaporated was used as the high-molecular silicon compound K1. When the weight-average molecular weight was measured under the following condition, the weight-average molecular weight Mw of K1 was 1200.

Similarly, the silicone oil; KF-96-30CS (by Shin-Etsu Chemical Co., Ltd.) processed under a condition of a normal pressure, 200° C. and 3 hours was used as the high-molecular silicon compound K2. When the weight-average molecular weight was measured under the following condition, the weight-average molecular weight Mw of K2 was 1100.

(Measurement of Weight-Average Molecular Weight Mw of High-Molecular Silicon Compounds K1 and K2)

The weight-average molecular weight (Mw) was measured by using gel permeation chromatography (GPC) described above.

<Fabrication of Fixing Roller 1>

A die having a desired size was set on the core metal machined to a predetermined size. In the process of preparing the silicone mixture, the silicone mixture in which 0.04 mass parts of K1 kneaded in 100 mass parts of the silicone rubber raw-material KE-961-U (by Shin-Etsu Chemical Co., Ltd.) inside in advance was prepared. Then, this was injected into the die and heated at 150° C. for 30 minutes so as to promote hardening of rubber (vulcanization), and a precursor of the silicone rubber made of the silicone mixture was formed and then, it was ejected from the die. After that, in the process of heating the precursor, the precursor of the formed silicone rubber was introduced into the heating device and heated to a predetermined temperature. Here, it was heated to 150° C. and left for 5 hours, and processing of reducing residual volatilization part was executed.

<Fabrication of Fixing Rollers 2 to 11>

The fixing rollers 2 to 11 were fabricated similarly to the fabrication of the fixing roller 1 except that, in the fabrication of the fixing roller 1, a type and added amount of the high-molecular silicon compound in the process of preparing the silicone mixture and the heating temperature and time in the process of heating the precursor were changed as indicated in Table 1.

<Measurement by Gas-Chromatography Mass Spectrometry (GC/MS Method)>

With respect to the silicone rubber of each of the fixing rollers, soluble components solvent-extracted as described above were measured by the gas-chromatography mass spectrometry (GC/MS method) with the aforementioned observing device, the column condition, and the temperature rise condition. Then, the integrated value of the low-molecular component from 10 minutes to 32 minutes of the retention time and the integrated value of the high-molecular component from 32 minutes to 37 minutes of the retention time were acquired.

Moreover, a calibration curve of the integrated value of the high-molecular component from 32 minutes to 37 minutes and the content (mass %) was made from the integrated value of the high-molecular component from 32 minutes to 37 minutes of the retention time and the high-molecular component having the known weight-average molecular weight of polydimethylsiloxane, and the content (mass %) of the high-molecular component converted to polydimethylsiloxane was acquired.

<Evaluation of the Number of Volatilized Particles>

Printing was performed in a closed space in which a copying machine on which the fixing roller fabricated as above is mounted is sealed, and the atmosphere was recovered and analyzed. More specifically, each of the pressurizing rollers is assembled in the fixing device of bizhub C308 by Konica Minolta, Inc., and this rebuilt machine was installed in a chamber having a volume of 5 $m^3$ made by stainless steel, and ventilation was performed with an air amount of 15 $m^3$/h. Then, after the ventilation for approximately 1 hour, printing was performed only for 10 minutes, and only an amount of 10 mL/min of the volatile substances generated from inside the machine was sampled. After that, sampling was performed continuously only for approximately 20 minutes even after the printing was stopped. The atmosphere was observed by a nanoparticle grain-size distribution counter FMPS3091 (by TSI), and an accumulated value of the number of particles was counted. A count peak value was employed as a value, and 3000 cps (count(s) per second) or less was acceptable.

<Evaluation of Durability>

In the copying machine "bizhub PRO (registered trademark) C6501" (by Konica Minolta, Inc.) on which the fixing roller fabricated as above is mounted and used for the evaluation of the aforementioned number of volatile particles, printing on 100,000 sheets and 200,000 sheets was performed under a normal-temperature and normal-humidity environment (23° C., 50% RH), and fixity after that was evaluated. The fixity evaluation was made at a folding rank temperature which will be described later.

Moreover, in the present invention, the folding rank temperature at 160° C. or less was acceptable.

The folding rank temperature was observed as follows.

An unfixed solid black image was output by a black developing agent to an A3-sized sheet of "CF80 paper (80 g/$m^2$)" as an evaluation sheet. Moreover, the fixation processing was executed to this unfixed solid black image while a fixation setting temperature was changed so as to be increased from 100 to 180° C. by 5° C. each. The solid black image after fixation of a printed matter obtained at each of the fixation temperatures was folded at a center, a weight of 500 g was placed at the folded position and the weight was removed after reciprocation 5 times. Subsequently, the folded image was opened and returned. Subsequently, at the folded position, a width in which the image was damaged and broken was measured by a caliper, and a lowest temperature from 100 to 180° C. at which the width exceeds 1 mm was made a folding rank temperature.

The aforementioned evaluation result is illustrated in Table 1:

TABLE 1

| | Fixing roller | | | | GC/MS measurement | | |
|---|---|---|---|---|---|---|---|
| | | High-molecular silicon compound | | Heating | | Integrated value of low-molecular component amount from 10 minutes to | Integrated value of high-molecular component amount from 32 minutes to | High-molecular |
| Fixing roller number | Type | Added amount [mass part] | Temperature [° C.] | Time [hr] | 32 minutes of retention time | 37 minutes of retention time | component [mass %] |
| 1 | K1 | 0.04 | 150 | 5 | 1.89 | 7.92 | 0.081 |
| 2 | K1 | 0.04 | 160 | 5 | 1.69 | 4.89 | 0.031 |
| 3 | K1 | 0.04 | 250 | 5 | 0.78 | 3.12 | 0.021 |
| 4 | K1 | 0.04 | 230 | 5 | 1.62 | 4.67 | 0.039 |
| 5 | K1 | 0.04 | 280 | 5 | 0.12 | 5.73 | 0.054 |
| 6 | K1 | 0.10 | 280 | 5 | 0.13 | 11.32 | 0.119 |
| 7 | K1 | 0.30 | 280 | 5 | 0.14 | 28.29 | 0.291 |
| 8 | K2 | 0.04 | 230 | 5 | 10.97 | 35.50 | 0.360 |
| 9 | — | — | — | — | 15.40 | 2.89 | 0.049 |
| 10 | — | — | 160 | 3 | 12.13 | 2.70 | 0.038 |
| 11 | — | — | 200 | 4 | 0.15 | 1.42 | 0.021 |

TABLE 1-continued

| Fixing roller number | Number of volatile particles [CPS] | Durability | | Remarks |
| | | Folding rank temperature after printing on 100,000 sheets [° C.] | Folding rank temperature after printing on 200,000 sheets [° C.] | |
| --- | --- | --- | --- | --- |
| 1 | 3179 | 152 | 153 | Present invention |
| 2 | 2870 | 153 | 154 | Present invention |
| 3 | 1550 | 155 | 158 | Present invention |
| 4 | 1685 | 148 | 148 | Present invention |
| 5 | 280 | 145 | 145 | Present invention |
| 6 | 310 | 144 | 144 | Present invention |
| 7 | 430 | 143 | 143 | Present invention |
| 8 | 28000 | 144 | 144 | Present invention |
| 9 | 35000 | 152 | 153 | Comparative example |
| 10 | 37000 | 150 | 152 | Comparative example |
| 11 | 290 | 168 | 170 | Comparative example |

From the result in Table 1, it is known that the fixing roller having the silicone rubber member formed by the silicone rubber composition of the present invention is excellent in durability. Moreover, it was also known that the number of volatile particles can be reduced by making the integrated value of the low-molecular component from 10 minutes to 32 minutes of the retention time to 1.7 or less. That is, it was known that contamination on the peripheral member caused by volatilization of the low-molecular component in the silicone rubber can be suppressed.

When the fixing rollers 1 to 11 fabricated above were left under the environment of the temperature of 30° C. and the humidity of 80% RH for one week, a bleedout phenomenon was observed on the surface only of the fixing roller 8, and it was known that the integrated value of the high-molecular component is preferably within 30.

Although embodiments of the present invention have been described and illustrated in detail, it is clearly understood that the same is by way of illustration and example only and not limitation, the scope of the present invention should be interpreted by terms of the appended claims.

The Description, Claims, Drawings and Abstract of Japanese Patent Application No. 2018-132840 filed with Japan Patent Office on Jul. 13, 2018 are all incorporated herein for reference.

What is claimed is:

1. A silicone rubber composition, in a fixing member having a rubber member on a surface used in an image forming apparatus, for forming the rubber member, wherein
the silicone rubber composition comprises a high-molecular component,
an integrated value of the high-molecular component from 32 minutes to 37 minutes of retention time in measurement of gas-chromatography mass spectrometry (GC/MS method) conducted under a predetermined condition is 3.0 or more,
the integrated value of the high-molecular component is $$\frac{\text{peak area(s) during the retention time of 32 to 37 minutes}}{\text{all peak areas during the measurement}} \times 100,$$

and
the predetermined condition includes:
a solvent extraction condition wherein a sample has a cuboid shape with a side of approximately 5 mm; the sample is then immersed in 50 mL of chloroform and agitated at a normal temperature for 2 hours, and then, left for 24 hours; the sample is dried at a normal temperature so as to obtain a dried and hardened article; and the dried and hardened article is dissolved into hexane to have a 10 mL sample solution, and
a GC/MS condition wherein a time when the sample solution is injected is set to 0 minutes of the retention time; a temperature is held at 40° C. for 5 minutes, the temperature is then raised to 140° C. at a rate of 5° C./min, and the temperature is raised from 140 to 290° C. at a rate of 20° C./min; a column is DB-XLB 30m, an injection port temperature is 250° C., a carrier gas is helium, a carrier gas flowrate is 1 mL/minute, a mass analyzer temperature is 320° C. at an interface and 250° C. at an ion source, and a detector voltage is 1000 V.

2. The silicone rubber composition according to claim 1, wherein
the silicone rubber composition further comprises a low-molecular component,
an integrated value of the low-molecular component from 10 minutes to 32 minutes of the retention time in the measurement of the GC/MS method is 1.7 or less, and the integrated value of the high-molecular component from 32 minutes to 37 minutes of the retention time is within a range from 3.0 to 30, and
the integrated value of the low-molecular component is $$\frac{\text{peak area(s) during the retention time of 10 to 32 minutes}}{\text{all peak areas during the measurement}} \times 100.$$

3. The silicone rubber composition according to claim 1, wherein
the silicone rubber composition further comprises a low-molecular component,
an integrated value of the low-molecular component from 10 minutes to 32 minutes of the retention time in the measurement of the GC/MS method is 1.3 or less, and the integrated value of the high-molecular component from 32 minutes to 37 minutes of the retention time is within a range from 5.0 to 30, and the integrated value of the low-molecular component is $$\frac{\text{peak area(s) during the retention time of 10 to 32 minutes}}{\text{all peak areas during the measurement}} \times 100.$$

4. The silicone rubber composition according to claim 1, comprising 0.05 mass % or more of a high-molecular silicon compound having a weight average molecular weight within a range from 900 to 1700.

5. A fixing member used in an image forming apparatus and having a rubber member on a surface, wherein the rubber member is molded by using the silicone rubber composition according to claim 1.

6. A manufacturing method of a fixing member for manufacturing the fixing member according to claim 5, comprising:
   preparing a silicone mixture by adding a high-molecular silicon compound having a weight-average molecular weight within a range from 900 to 1700 to a silicone rubber raw-material; and
   heating a precursor of a silicone rubber made of the silicone mixture to form the rubber member of the fixing member.

7. The manufacturing method of a fixing member according to claim 6, wherein
   a temperature in the heating the precursor is within a range from 160 to 280° C.

8. An image forming apparatus comprising the fixing member according to claim 5.

* * * * *